(12) United States Patent
McKnight et al.

(10) Patent No.: US 7,764,716 B2
(45) Date of Patent: *Jul. 27, 2010

(54) SYSTEM AND METHOD FOR WIRELESSLY TRANSMITTING AND RECEIVING DIGITAL DATA USING ACOUSTICAL TONES

(75) Inventors: Thomas Richard McKnight, Ellicott City, MD (US); Eric C. Haseltine, Odenton, MD (US)

(73) Assignee: Disney Enterprises, Inc., Burbank, CA (US)

( * ) Notice: Subject to any disclaimer, the term of this patent is extended or adjusted under 35 U.S.C. 154(b) by 1138 days.

This patent is subject to a terminal disclaimer.

(21) Appl. No.: 10/465,387

(22) Filed: Jun. 19, 2003

(65) Prior Publication Data

US 2004/0081078 A1 Apr. 29, 2004

Related U.S. Application Data (60) Provisional application No. 60/390,476, filed on Jun. 21, 2002, provisional application No. 60/390,500, filed on Jun. 21, 2002.

(51) Int. Cl.
 *H04J 3/12* (2006.01)
(52) U.S. Cl. .................... 370/525; 370/527; 375/295; 375/316
(58) Field of Classification Search ......... 370/525–529, 370/210; 379/93.28, 388.01; 381/15; 375/260, 375/271, 295, 302, 316, 322; 367/135, 137, 367/138
See application file for complete search history.

(56) References Cited

U.S. PATENT DOCUMENTS

| | | | |
|---|---|---|---|
| 4,661,659 A | 4/1987 | Nishimura | 379/61 |
| 4,817,135 A | 3/1989 | Winebaum | 379/355 |
| 4,864,604 A | 9/1989 | Aihara | 379/110 |
| 4,926,464 A | 5/1990 | Schley-May | 379/99 |
| 4,980,910 A | 12/1990 | Oba et al. | 379/355 |
| 4,995,077 A | 2/1991 | Malinowski | 379/355 |
| 5,081,441 A | 1/1992 | Chojar | 340/384 |
| 5,099,507 A | 3/1992 | Mukai et al. | 379/57 |
| 5,280,516 A | 1/1994 | Jang | 379/57 |
| 5,343,519 A | 8/1994 | Feldman | 379/355 |
| 5,355,511 A * | 10/1994 | Hatano et al. | 455/11.1 |
| 5,357,566 A | 10/1994 | Dowling, Jr. et al. | 379/355 |
| 5,392,447 A | 2/1995 | Schlack et al. | 395/800 |
| 5,452,352 A | 9/1995 | Talton | 379/355 |
| 5,455,857 A | 10/1995 | McGuire | 379/355 |
| 5,517,511 A * | 5/1996 | Hardwick et al. | 714/755 |
| 5,583,919 A | 12/1996 | Talvard et al. | 379/67 |
| 5,583,933 A | 12/1996 | Mark | 379/355 |

(Continued)

FOREIGN PATENT DOCUMENTS

EP 0550144 A1 7/1993

*Primary Examiner*—Seema S Rao
*Assistant Examiner*—Jianye Wu
(74) *Attorney, Agent, or Firm*—Greenberg Traurig, LLP (57) ABSTRACT

A system and a method for the transmission and reception of digital data wirelessly using acoustic tones comprises a device having an encoder, a modulator system, a demodulator system, and a decoder. The modulator system uses dual tone multiple frequency (DTMF) tones that are amplitude modulated. The received signal is demodulated and detected by Fourier analysis. An expanded Hamming code based decoder is used for correcting errors occurring during transmission.

31 Claims, 5 Drawing Sheets

U.S. PATENT DOCUMENTS

| | | | |
|---|---|---|---|
| 5,636,270 A | 6/1997 | Davey | 379/352 |
| 5,642,397 A * | 6/1997 | Agbaje-Anozie | 370/313 |
| 5,671,271 A | 9/1997 | Henderson et al. | 379/355 |
| 5,786,819 A | 7/1998 | Weiser et al. | 345/354 |
| 5,790,644 A | 8/1998 | Kikinis | 379/144 |
| 5,898,708 A * | 4/1999 | Tateishi et al. | 714/752 |
| 5,901,217 A | 5/1999 | Kanbar | 379/355 |
| 5,930,703 A | 7/1999 | Cairns | 455/418 |
| 5,963,637 A | 10/1999 | Arzoumanian | 379/355 |
| 5,978,654 A | 11/1999 | Colwell et al. | 455/31.1 |
| 5,982,520 A | 11/1999 | Weiser et al. | 359/172 |
| 6,028,926 A | 2/2000 | Henderson et al. | 379/355 |
| 6,115,478 A * | 9/2000 | Schneider | 381/314 |
| 6,119,944 A | 9/2000 | Mulla et al. | 235/472.03 |
| 6,130,859 A * | 10/2000 | Sonnenschein et al. | 367/134 |
| 6,304,638 B1 * | 10/2001 | Coulter et al. | 379/93.37 |
| 6,377,916 B1 * | 4/2002 | Hardwick | 704/208 |
| 6,400,821 B1 * | 6/2002 | Burgan et al. | 379/361 |
| 6,469,642 B1 * | 10/2002 | Kreppold | 341/20 |
| 6,490,243 B1 * | 12/2002 | Tanaka et al. | 370/216 |
| 6,546,261 B1 * | 4/2003 | Cummings | 455/552.1 |
| 6,607,136 B1 * | 8/2003 | Atsmon et al. | 235/492 |
| 6,864,413 B2 * | 3/2005 | Shiiya | 84/610 |
| 7,187,718 B2 * | 3/2007 | Jensen | 375/260 |
| 2001/0055352 A1 * | 12/2001 | Bannasch et al. | 375/348 |
| 2004/0081078 A1 * | 4/2004 | McKnight et al. | 370/210 |

* cited by examiner

SYSTEM AND METHOD FOR WIRELESSLY TRANSMITTING AND RECEIVING DIGITAL DATA USING ACOUSTICAL TONES

CROSS-REFERENCE To RELATED APPLICATIONS

The contents of this application are related to provisional applications having Ser. Nos. 60/390,500 (filed Jun. 21, 2002) and 60/390,476 (filed Jun. 21, 2002). The contents of these related provisional applications are incorporated herein by reference.

BACKGROUND OF THE INVENTION

1. Field of the Invention

The present invention relates to communication devices for communicating signals wirelessly.

Especially, the present invention relates to a system and method for transmitting digital data between communicating devices using acoustic tones as the information carriers for the data.

2. General Background

One of the most difficult challenges faced by providers of low cost wireless computer peripheral devices is the need to distribute custom interface hardware so that the peripheral device can communicate with the computer. The interface hardware not only adds cost to the product, but for many products such as low cost toys, the sales and distribution channels are not prepared to support the distribution of these additional computer devices.

As a result, a mechanism is required whereby devices can communicate with a personal computer, or with each other, using standard hardware (e.g., digital signal processing chips, analog to digital converters, etc.). In addition, the devices, employing this communication mechanism, should be flexibly designed to operate in conditions where line-of-sight communication between said devices is required.

There are many techniques that encode data into an audio frequency signal for transmission and subsequent detection over a communications channel. These techniques as a class are fundamentally different in that they do not use the acoustic pressure waves as the communications mechanism.

SUMMARY OF THE INVENTION

Clearly there is a need for using sound or acoustic tones as carriers of digital data in simple and low cost devices. Specifically, the present invention of using acoustic tones as carriers of digital data arose from the need to transmit low bandwidth data between a peripheral device and a computer (or another device) using existing sound recording and playback means such as loudspeakers and microphones, respectively.

The system and method of the present invention allows for the transmission (and reception) of digital data wirelessly using sound. Specifically, this technique modulates digital data bits onto chords consisting of three or more pure tone notes such as Dual Tone Multiple Frequency (DTMF) tones. This involves a modulation scheme, such as amplitude modulation, of each of the individual tones within the chord relative to each other. Because of the nature of the modulation, humans may be unable to discern a difference in the sound of the transmission for different data patterns. At the receiver, demodulation is done so that the digital data is extracted from the pure tones. The use of this technique can be extended such that the tonal "content" for a variety of applications can be developed where such tonal content is not adversely affected by the presence of external noise. From a hardware perspective, the communication between devices is enabled by means of digital signal processors (DSPs) that have embedded algorithms to perform modulation and demodulation, analog-digital converters, loudspeakers, etc.

Accordingly, in one embodiment of the present invention, the digital data transmitting system using acoustic tones comprises a device having: (i) at least one generator for generating digital data; (ii) a modulator system, the modulator system modulating a plurality of pure tone notes with the digital data; and (iii) at least one loudspeaker, the loudspeaker transmitting the modulated tones. Additionally, the digital data includes a pseudo random code, a plurality of message bits, and a plurality of correction bits. The correction bits are based on error correcting codes such as an expanded Hamming code or Golay code. The pure tone notes may either lie in the infrasonic, audio, or ultrasonic band, and could be Dual Tone Multiple Frequency (DTMF) tones. Additionally, the device for transmitting digital data wirelessly comprises: (i) a modulator for modulating a plurality of pure tones with digital data to generate a signal; (ii) a loudspeaker for transmitting the signal; (iii) a micro-controller for generating the plurality of pure tones; and (iv) an encoder. The device may be a handheld device (such as a pen).

In another embodiment of the present invention, a receiver for receiving the acoustic tones (e.g., DTMF tones) modulated by digital data comprises: (i) means for computing Fourier transform through at least one overlapping window; (ii) means for identifying at least one frame marker in the at least one overlapping window; (iii) means for determining the at least one marker alignment by optimizing alignment of the at least one window for maximum energy from the at least one marker; (iv) means for determining a set of substantially optimally aligned windows for identifying pure tones in each frame; (v) means for decoding the pure tones for each of the optimally aligned windows in said each frame; and (vi) means for converting the decoded pure tones to bits. Furthermore, the receiver may also include means for de-interleaving N b-bit error coded blocks, and means for performing error correction (using an expanded Hamming code or Golay code) and detection of data bits. In one aspect of the invention, N=8 and b=8. The window may be either a rectangular window, a Hamming window, a Hanning window, a Blackman window, a triangular window, a raised cosine window, or any combination thereof. Additionally, the receiver will include at least one microphone for receiving the digitally modulated data.

BRIEF DESCRIPTION OF THE DRAWINGS

In order that the manner in which the above-recited advantages and objects of the invention are attained, as well as others which will become apparent, more particular description of the invention briefly summarized above may be had by reference to the specific embodiments thereof that are illustrated in the appended drawings. It is to be understood, however, that the appended drawings illustrate only typical embodiments of the invention and are therefore not to be considered limiting of its scope, for the invention may admit to other equally effective embodiments.

In the drawings.

DETAILED DESCRIPTION OF THE INVENTION

Referring now in detail and by reference characters to the drawings (FIGS. 1-5), which illustrate several different embodiments of the present invention, therein shown is a system and method for transmitting and receiving acoustic tones for wireless communications. Such a system, as in the present invention, employs circuits that enable transmission of low bandwidth data between multiple devices (or a computer) using the device's hardware (e.g., sound card, microphone, loudspeaker, DSP chips, analog-digital converters, etc.). The communication environment could be a living room, an automobile cabin, a telephone channel, a non-confined environment (e.g., a playground), theater, etc.

A computer or a device may include an algorithm to reliably receive and decode digital data, sent by a similar device, embedded in an audio signal (from at least one loudspeaker) in the average living room channel, media room or den, anywhere within a reasonable distance, such as between 2 ft to 30 ft of the loudspeaker, and within a volume of space subtended by pi radians in front of the loudspeaker. The algorithm is designed so that the signal reception is independent of the loudspeaker system and room characteristics (e.g., reverberation time), and it is reliable in the presence of noise when the audio is at normal listening levels. Furthermore, the algorithm is designed so that signal reception at the receiver is independent of the location of the receiver inside the specified distance from the sound source (i.e., the loudspeaker).

Figure 1:
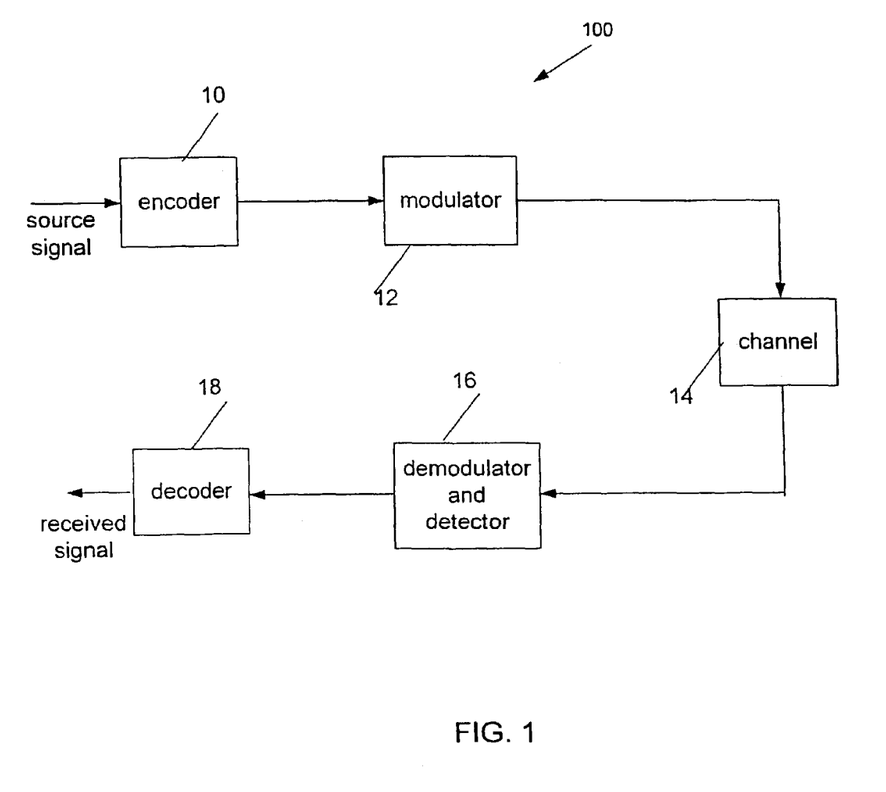
FIG. 1 is a block diagram of the communication system for using acoustic tones for wireless communication.

The source signal (as shown in FIG. 1) could be an audio based signal (frequency range of 20 Hz-20 kHz), an infrasonic signal (below the threshold of hearing), or an ultrasonic signal (above 20 kHz). For example, the audio signal could be at least one of a DTMF tone. Digital data could be encoded into this DTMF tone(s), via the encoding scheme, and the received signal could be demodulated/decoded by the algorithm in a receiver housed in a device or a computer. The demodulation scheme, implemented in the receiver, is done via the present invention.

It is important that the communication of digital data between the transmitting device and the receiver be reliable. Specifically, under best-case conditions, no more than 1 misread or undetected data segments out of 10,000 broadcast data segments should be allowed. Under the worst-case conditions, no more than 1 misread or undetected data segment out of 1000 broadcast data segments are permitted.

Furthermore, the communication algorithm, according to the present invention, should be robust under the presence of noise in different environments. Noise can be characterized as continuous or impulsive, and broadband or fixed-frequency (narrow band). Noise can also be classified by annoyance factors: voices and music may be deemed more annoying than random noise, as are hammering (impulsive) or continuous tones (narrow band). As a reference, once a noise level exceeds 67 dBA, it begins to interfere with communication between people 3 ft. apart. Further details on noise and its effects in different environments will be presented below.

It is also important to maintain a certain data rate for communication between the device and the receiver. While a minimum data rate of 24 bits/sec should be achieved, a more important measure is the duration of the data. A 16-bit data at 24 bits/sec takes two thirds of a second, but this does not take into account the bits that may be required for synchronization and/or data correction schemes. Thus, in one aspect of the present invention, a complete data pulse is no longer than 1 second in duration.

The device can communicate with the receiver (having a decoding algorithm) in a variety of environments, and at various signal to noise ratios, including:

Living Room

The algorithm is able to reliably receive and decode digital data embedded in an audio signal (e.g., DTMF tones) in the average living room, media room or den, anywhere within approximately 2 ft to 20 ft of the device, and within a volume of space subtended by pi radians in front of the loudspeaker (in the device). The algorithm is designed so that the signal reception is substantially independent of the loudspeaker and room acoustical characteristics. Also, the algorithm is designed to communicate reliably in the presence of noise when the audio signal is at normal listening levels. Furthermore, the signal reception is independent of the location of the receiver.

Regarding noise, the typical interior residential noise level is 30 to 40 dBa, 50 to 55 dBa with voices. Possible ambient noise sources include voices, music, barking dogs and other household sounds. Both impulsive and continuous noise sources can be expected. A reasonable upper limit for background noise level is 60 dBa. Accordingly, the algorithm in the receiver is designed to accommodate a signal to noise ratio ranging between +27 dB and −3 dB.

Automobile

The algorithm (in a receiver) is able to reliably receive and decode data sent embedded in an audio signal (e.g., DTMF tones) in the average automobile. The algorithm is designed so that the signal reception is substantially independent of the loudspeaker and automobile cabin interior characteristics, and the algorithm operates reliably in the presence of noise when the audio signal is at normal listening levels. Also the signal reception is independent of the location of the device inside the vehicle.

While very dependent on vehicle type, the range of the normal listening level for the audio signal, such as one coming from a speaker, in an automobile is typically 65 dBA (at low speeds) to 78 dBA (at high speeds). A reasonable lower limit is 60 dBA.

Regarding noise, it can vary considerably with the velocity of the car. Engine and drive train noise is typically low frequency (<100 Hz), while aero-acoustic and tire noise is middle frequency and increases with increasing velocity. Also, there are air conditioning and air sounds from open windows. Other than the occasional horn blast and crash, most interior vehicle noise is generally continuous.

Typical interior vehicle noise levels (for test vehicles such as Honda Accord and CRV):

Stopped, in traffic 53 dBA 70 mph, constant 66 dBA to 70 dBA

Accelerating with window partially open 86 dbA

The audio signal level may be set at 3 to 10 dB over the ambient noise. Accordingly, the algorithm is designed to accommodate a signal to noise ratio ranging between +12 dB to −10 dB.

Desktop Environment

The algorithm, which is in a receiver associated with a computer, is able to reliably receive and decode data sent via a device having at least one loudspeaker in the average bedroom, office or den, anywhere within an average distance from the loudspeaker. The algorithm is designed so that the signal reception is substantially independent of the speaker and room characteristics. Also, the algorithm operates with reliability in the presence of noise when the audio signal (e.g., DTMF tones) is at normal listening levels. Additionally, the algorithm is designed so that the signal reception is independent of the location of the receiver inside the specified distance from the loudspeaker.

The range of normal listening level for PC audio at a distance of 4 ft from the speakers is 55 to 65 dBA. A reasonable lower limit is 55 dBA. In the home environment, noise levels are expected to be of the order of the levels found in the living room environment. In an office environment, typical background noise levels are about 45 to 55 dBA, including fan noise, or 55 to 65 dBA when a person is listening to music on his or her computer. Nearby activity and conversation can raise this to anywhere from 65 to 80 dBA. A reasonable worst case for background noise in an office is 75 dBA. Accordingly, the algorithm is designed to accommodate a signal to noise ratio ranging between +10 dB to −10 dB.

Telephone Channel

The algorithm is able to reliably receive and decode data sent via a telephone audio signal (e.g., DTMF tones) within about 2 in. of the telephone headset or hands-free speaker.

A telephone dial tone at this distance ranges from 48 dBA to 55 dBA, with 52 dBA being typical, and 48 dBA being a reasonable lower limit.

Expected background noise is similar to the home and office scenarios above, and are therefore expected to be 50 to 65 dBa, with 65 dBa being a reasonable upper limit. Accordingly, the algorithm is designed to accommodate a signal to noise ratio ranging between +5 dB to −17 dB.

Open Environment (e.g., Playground)

The algorithm in the receiver is able to reliably receive and decode digital data sent by a device in relatively close proximity, or within 2 to 4 in, in a variety of environments, including outdoors (of course, the algorithm may be appropriately modified if this distance changes). This scenario is unique as lower reliability is acceptable, since to a certain extent users will re-transmit the digital data until successful reception. Typical noise levels in an outdoor urban environment are both impulsive and continuous and are in the range of 45 to 65 dBA, with peaks of up to 70 dBA, depending on proximity to traffic and commercial noise sources. As an example, children's shouting in a playground can exceed 90 dBA. Accordingly, the algorithm is designed to accommodate a range of signal to noise ratios.

Figure 4:
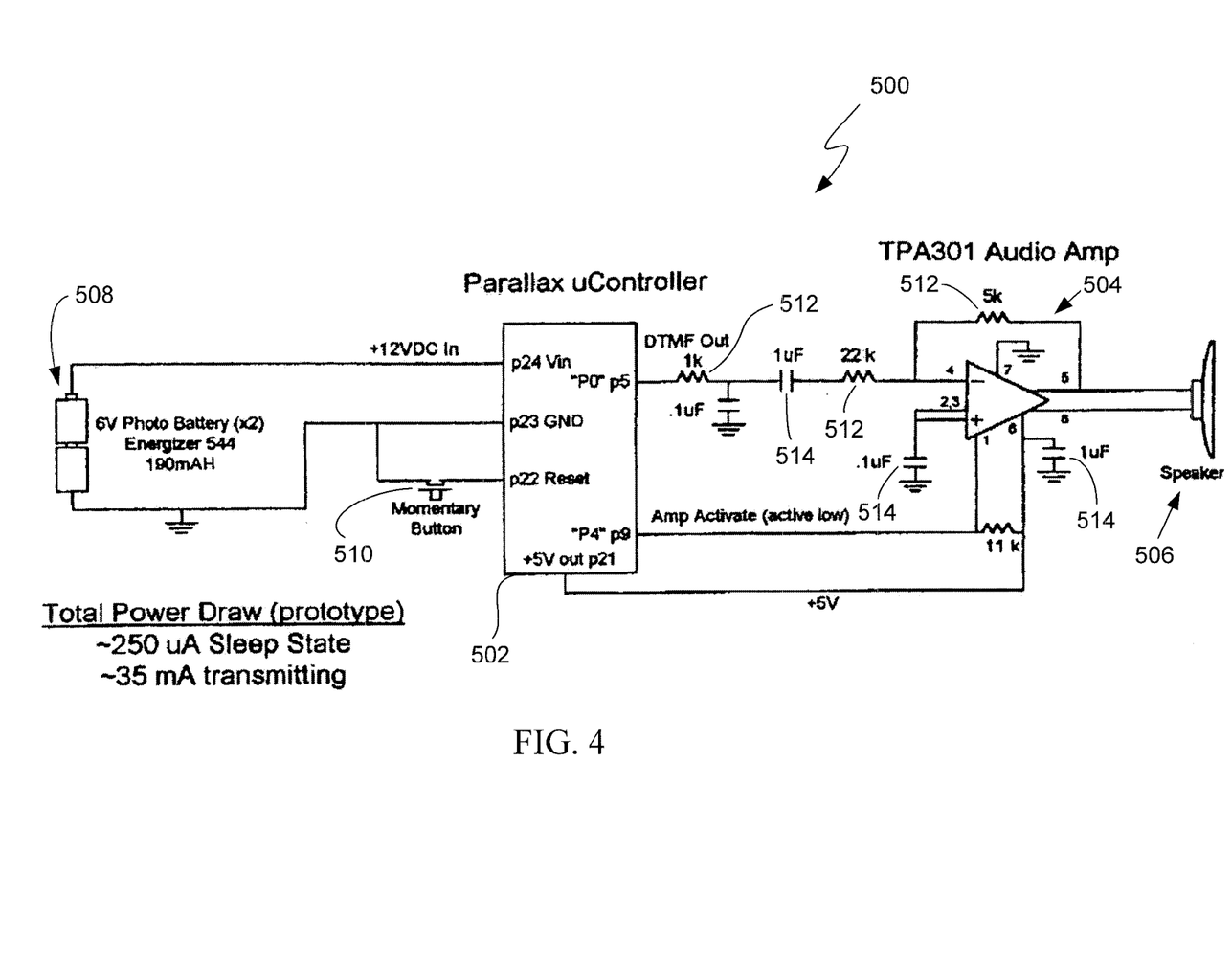
FIG. 4 is a circuit diagram of a device having at least one embedded DSP chip for performing modulation, analog-digital converters, digital-analog converters, loudspeaker.
Figure 5:
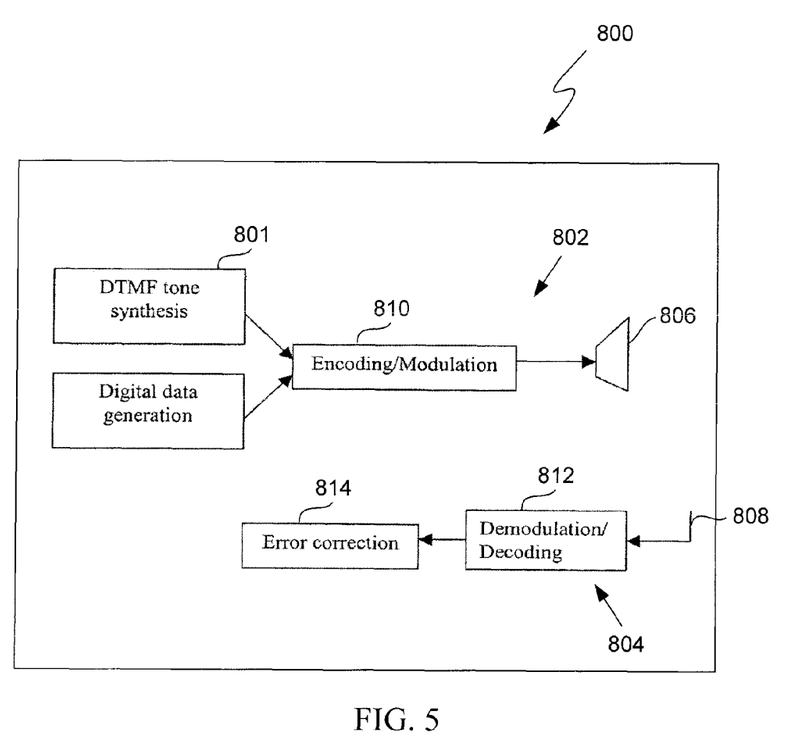
FIG. 5 is a block diagram of a digital device including a transmitter and a receiver operating with DTMF tones.

An example of a device is shown in FIG. 4. Specifically, FIG. 4 shows an exemplary view of a device 500 having at least one embedded DSP chip 502 including a micro-controller for generating DTMF tone(s) (shown at output port p5). The device 500 may also include means for encoding digital data (not shown), digital-analog converter 504, loudspeaker 506, a power supply 508, switching means 510, and various resistors 512 and capacitors 514 in an operable configuration. During operation, the digital data may be encoded, and the resulting encoded signal may then be used to modulate an audio or DTMF signal. The modulated signal is transmitted by the loudspeaker 506 to another similar device 800 having a receiver, as shown in FIG. 5, with a decoding/demodulation algorithm, or to a separate receiver working in conjunction with a computer. The device 500 (which could be designed to be portable) uses the switching button 510 to cycle through digital data (e.g., information on website addresses) stored in the controller's memory. In the desktop environment, as an example, to operate the pen the following steps could be needed: (i) install and run related software on a PC with a microphone and browser; (ii) push the button 510 on the pen, anywhere near the PC; and (iii) watch the browser go to the appropriate URL.

The complete system for transmitting and receiving digital data (as depicted in FIG. 1) includes the device 500 having (i) a sound synthesis means (e.g., a sound card or the controller chip 502 that outputs DTMF signals); (ii) a sound/data receiving means (e.g., a microphone); (iii) a sound/data transmission means (e.g., the loudspeaker 506); (iv) a processing means for encoding and decoding digital data; (v) analog-digital and digital-analog converters. The following description explains the encoding and decoding method of digital data with reference to FIGS. 1-3.

The present system, in its preferred embodiment, encodes the source signal using, for example, an expanded Hamming code or an extended Golay code encoding scheme 10. The encoded sequence or digitized data, at the output of the encoder 10, is mapped using the modulator system 12 onto pure tones (e.g., DTMF tones). This modulation could involve amplitude modulation of each of the individual tones relative to each other. Because of the nature of the modulation, humans may be unable to discern a difference in the sound of the transmission for different data patterns. The use of this system can be extended so that sound "content" for a variety of applications can be developed where the content is not adversely affected by the presence of the data. For the aforementioned scenario, the system can achieve a bit rate of about 12 bps (40 symbols per second, using redundancy and coding) so the tone would be a couple of seconds long. The encoded or message signal at the output of the encoder 10 is a digital signal. Depending on the nature of the encoder the digital signal may be of a predetermined length.

Figure 2:
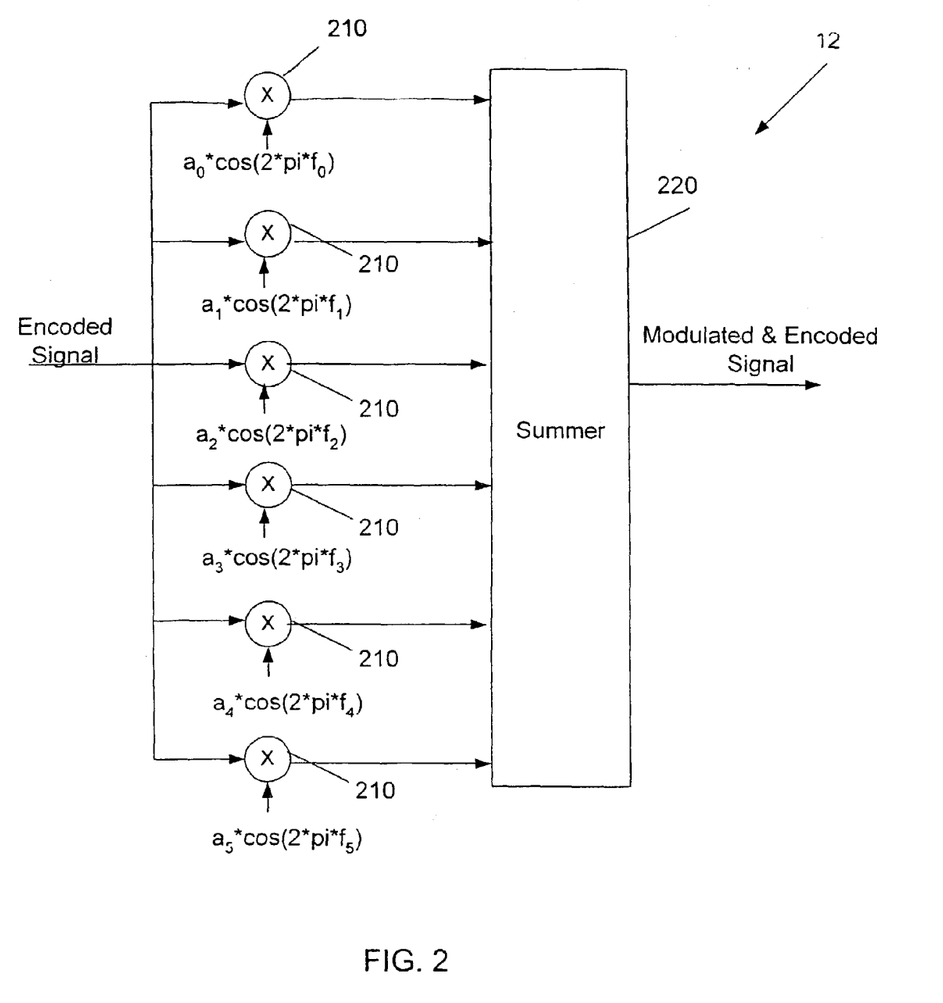
FIG. 2 shows a block diagram of the modulator depicting an exemplary embodiment of the tones having specific amplitudes and frequencies used for modulation.

The details of the modulator system 12 are depicted in FIG. 2. The encoded signal at the output of the encoder 10 is supplied to a bank of correlators 210. Each correlator 210 has two inputs, one input coming from the encoder 10 and the other input being a sinusoidal signal with appropriate frequencies and amplitude factors corresponding to valid DTMF tones. The modulated tones are then summed in the summer 220 after the modulation.

Figure 3:
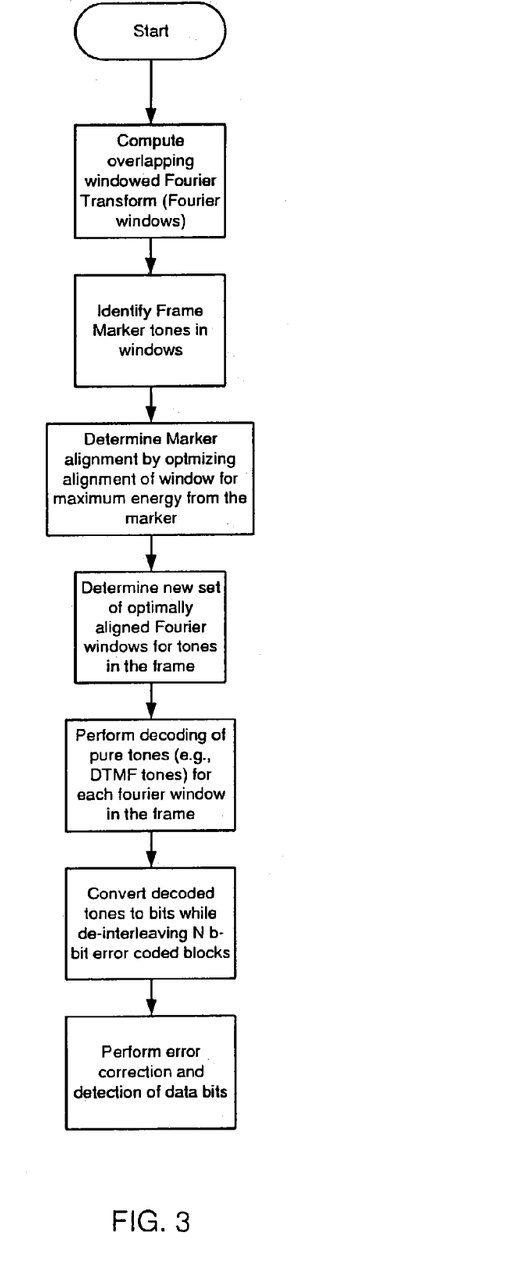
FIG. 3 is a flow chart depicting the receiver demodulation/detection process for the present invention.

A receiver is employed at the computer terminal or peripheral to receive the encoded and modulated signal transmitted by the device 500 via the channel 14 (FIG. 1). The first step in the receiver, 16 (FIG. 1), is the recovery of the modulated tones. The demodulation/decoding steps in the receiver 16 are shown in FIG. 3. Specifically, the algorithm performs the following step by step operations:

(a) Partially pre-computes the discrete Fourier transform for sound data buffer, computes overlapping windowed Fourier Transform for buffer (for example the windows could be either a rectangular window, a Hamming window, a triangular window, a Blackman window, a Hanning window, a raised codine window, or any combination thereof); (b) searches for Frame marker tones at expected spacing in computed fourier windows; (c) computes exact Mark/Space alignment of discovered frame by exactly optimizing the alignment of a Fourier Window for maximum energy from the frame marker; (d) computes new set of optimally aligned Dourier windows for all tones in the discovered frame; (e) performs decoding for each window in the frame, which correspond directly to single tones due to alignment; (f) converts decoded tones to raw bits, de-interleave the N b-bit error coded blocks (for e.g., N=8 and b=8 in one aspect of the invention); (g) performs error correcting and detecting algorithm on the b-bit data blocks, resulting in N*b bits of corrected data If no more than 1 error per each of the N blocks. If two errors exist in one of the blocks, the decoding algorithm identifies that block as being uncorrectable.

Some of the key features of the system and algorithm are listed below:

(i) 32-bit frames of data, consisting of 18 tone; (ii) each frame may be stripped into 8 4-bit blocks; (iii) each block may be encoded using Error Correcting Coding such as an (8,4) expanded Hamming code that allows 1 error in each block to be corrected, and 2 errors in a block to be detected as an error; (iv) during Error Correcting Coding, data may be expanded to 64-bits; (v) at the beginning and end of each frame there may be a marker tone; (vi) for example, 50 millisecond DTMF tones were used followed by 50 millisecond spaces; (vii) in one aspect 8-bit unsigned linear sound data was used; (viii) sampling rates as low as 8 kHz may be used; (ix) real-time operation and fully parameterizable to desired speed of protocol transmission, frame length, and error coding algorithm.

FIG. 5 is a block diagram of a digital device 800 including a transmitter portion 802 and a receiver portion 804 operating with DTMF tones. The device 800 for transmitting and receiving digital data includes (i) a sound synthesis means (e.g., a sound card or the controller chip 801 that outputs DTMF signals); (ii) a sound/data receiving means (e.g., a microphone 808); (iii) a sound/data transmission means (e.g., the loudspeaker 806); (iv) a processing means for encoding 810 and decoding 812 digital data; (v) analog-digital and digital-analog converters; and (vi) error correction means 814. Accordingly, the device 800 is capable of communicating with another similar device having DTMF tone transmitting and/or receiving means.

While the specification describes particular embodiments of the present invention, those of ordinary skill can devise variations of the present invention without departing from the inventive concept. For example, the tones need not be DTMF but have a predetermined number of frequency components. The fundamental frequency of the tones, the harmonics, and the amplitudes of the fundamental and harmonics may be designed according to the application involved such as in Bluetooth based devices for vehicular, multimedia, and other environments. Also, the probability of bit error may be minimized by designing appropriate modulator (demodulator) systems based on Quadrature Amplitude Modulator (QAM).

We claim the following:

1. A digital data transmitting system using acoustic tones as a carrier of digital data, the system comprising:
   a) at least one generator generating digital data;
   b) a modulator system receiving DTMF carrier tones and the digital data, said modulator system modulating the DTMF carrier tones with the digital data; and
   c) at least one loudspeaker, the loudspeaker acoustically transmitting the modulated carrier tones for subsequent reception and demodulation of the modulated DTMF carrier tones to recover the digital data from the modulated DTMF carrier tones.

2. The digital data transmitting system according to claim 1, wherein the digital data comprises a pseudo random code.

3. The digital data transmitting system according to claim 2, wherein the digital data further comprises a plurality of message bits.

4. The digital data transmitting system according to claim 3, wherein the digital data further comprises a plurality of correction bits.

5. The digital data transmitting system according to claim 4, wherein the correction bits are based on an expanded Hamming code.

6. The digital data transmitting system according to claim 1, wherein the digital data is of length 32 bits.

7. The digital data transmitting system according to claim 1, wherein the modulator system is an amplitude modulator.

8. The digital data transmitting system according to claim 1, further comprising a summer for summing the modulated tones.

9. The digital data transmitting system according to claim 1, wherein the tones lie between 20 Hz and 20 kHz.

10. The digital data transmitting system according to claim 1, wherein the tones lie in the infrasonic band.

11. The digital data transmitting system according to claim 1, wherein the tones lie in the ultrasonic band.

12. The digital data transmitting system according to claim 1, wherein the DTMF carrier tones are generated by a controller.

13. A method for transmitting digital data using acoustic tones, the method comprising:
   a) generating digital data;
   b) modulating a plurality of previously generated DTMF carrier tones with the digital data; and
   c) transmitting the modulated carrier tones through a loudspeaker for subsequent reception and demodulation of the modulated DTMF carrier tones to recover the digital data from the DTMF carrier tones.

14. The method for transmitting digital data using acoustic tones according to claim 13, further comprising the step of summing the modulated tones after modulation.

15. The method for transmitting digital data using acoustic tones according to claim 13, wherein the digital data comprises a pseudo random code.

16. The method for transmitting digital data using acoustic tones according to claim 15, wherein the digital data further comprises a plurality of message bits.

17. The method for transmitting digital data using acoustic tones according to claim 16, wherein the digital data further comprises a plurality of correction bits.

18. The method for transmitting digital data using acoustic tones according to claim 17, wherein the correction bits are based on an expanded Hamming code.

19. The method for transmitting digital data using acoustic tones according to claim 18, wherein the digital data is of length 32 bits.

20. The digital data transmitting system according to claim 13, wherein the modulation is performed by an amplitude modulator.

21. The digital data transmitting system according to claim 13, wherein the tones lie in the infrasonic band.

22. The digital data transmitting system according to claim 13, wherein the tones lie in the ultrasonic band.

23. A device for transmitting digital data wirelessly, the device comprising:
   a modulator for modulating a plurality of previously generated pure carrier tones with digital data to generate a modulated pure tone carrier signal;
   a loudspeaker for transmitting the signal for subsequent reception and demodulation of the modulated pure carrier tones to recover the digital data; and
   a micro-controller connected to the modulator for generating the plurality of pure carrier tones.

24. The device according to claim 23, wherein the device is a handheld device.

25. The device according to claim 24, further including an encoder.

26. The device according to claim 24, wherein the plurality of pure carrier tones are DTMF tones.

27. The device according to claim 24, wherein the modulator is an amplitude modulator.

28. The device according to claim 24, wherein the frequency content of the signal is between 20 Hz and 20 kHz.

29. The device according to claim 24, wherein the frequency content of the signal is in the infrasonic band.

30. The device according to claim 24, wherein the frequency content of the signal is in the ultrasonic band.

31. A device for transmitting and receiving digital data wirelessly, the device comprising:

a transmitter including: (i) a modulator for modulating previously generated DTMF carrier tones with digital data to generate an acoustic signal; (ii) a loudspeaker for transmitting the acoustic signal; and a receiver including: (i) a microphone for capturing the acoustic signal; (ii) and a demodulator connected to said microphone for demodulating the acoustic signal.

\* \* \* \* \*